April 26, 1932.   A. S. WHITE   1,855,372
EXTRUDING DIE FOR BOLTS AND SCREWS
Filed Feb. 15, 1928
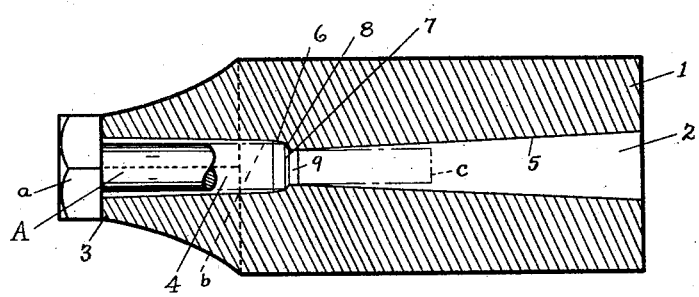
FIG. I
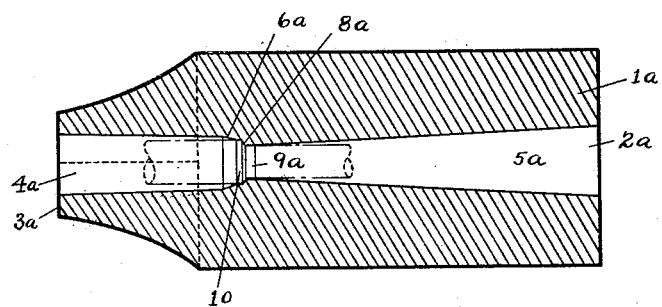
FIG. II
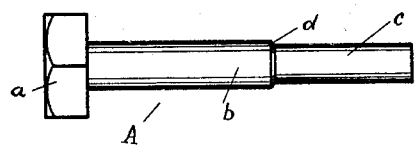
FIG. III
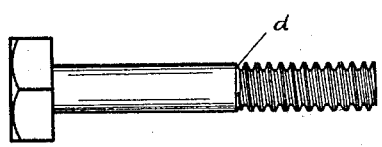
FIG. IV
INVENTOR
Arch S. White
by William B. Wharton
his attorney Patented Apr. 26, 1932

1,855,372

UNITED STATES PATENT OFFICE

ARCH S. WHITE, OF LIBRARY, PENNSYLVANIA, ASSIGNOR TO NEELY NUT AND BOLT COMPANY, OF PITTSBURGH, PENNSYLVANIA, A CORPORATION OF PENNSYLVANIA

EXTRUDING DIE FOR BOLTS AND SCREWS

Application filed February 15, 1928. Serial No. 254,581.

This invention relates to an extruding die for use in manufacturing bolts.

Such method consists in the operation of reducing the diameter of a portion of a bolt or screw blank during the continuous step of trimming the head of such blank. As set forth in such application, the extruding die is forced over the shank of the bolt or screw blank, and, by a continuous operation, moves forwardly to trim the head of the bolt.

If care is not used in the mutual proportioning of the various sections or areas of the die bore, it will be found that a raised portion, or shoulder, is formed on the stock of the blank immediately adjacent the shoulder which separates the portion retaining its original diameter from the shank portion which is reduced in its diameter.

One object of the invention is to provide an extruding die for use in a trimming machine, to reduce the diameter of a portion of the shank of a bolt or screw blank, and trim the head thereof by a continuous operation; such die being so proportioned throughout its bore that both the portion which is reduced in diameter, and the portion which retains its initial diameter, are of uniform diameter throughout the length of each.

A further object of the invention is to provide a die so shaped and proportioned that it will form on a bolt blank, between the portion of reduced diameter and the portion retaining its initial diameter, a shoulder having a contour identical with the face contour of a standard bolt or screw thread.

A still further object of the invention is to so center the shank of the bolt or screw blank in the die, at the beginning of the extruding movement of the die, that the periphery of the reduced portion of the shank is exactly concentric with the longitudinal axis of the bolt or screw blank.

In the accompanying drawings Figure I is a longitudinal sectional view through the extruding die of the present invention, showing a bolt or screw blank therein, and illustrating the position and condition of the blank at the end of the movement which produces extrusion of the shank and a trimming of the head of the blank; Figure II is a longitudinal sectional view, showing a modification in the bore of the extruding die; Figure III is an elevation of a bolt or screw blank after extrusion and before threading; and Figure IV is an elevation of the bolt or screw formed from such blank by the performance of a threading operation thereon.

In considering the extruding die, as shown in Figures I and II, it should be noted that the degree of angularity in certain regions of the die is exaggerated in accordance with the requirement of adequate illustration on a reasonable scale.

The extruding die comprises a body 1, having therein a bore which is indicated generally by the reference numeral 2. The bolt or screw blank operated upon is indicated generally by the reference character A.

As illustrated in Figure I of the drawings, the die 1 has moved forwardly over the bolt blank A, and the forward end 3 of the die has forced the head $a$ of the bolt blank into the trimming die to trim the head to its final form. The portion $b$ of the blank, which has not been reduced in diameter, lies in the forward portion 4 of the bore 2 of the extruding die. It will be noticed that the diameter of the bore portion 4 decreases gradually rearwardly of its length, so that the bolt portion $b$ lies loosely therein, and may be readily discharged therefrom. The rearward portion 5 of the die bore 2 has a diameter which decreases gradually forwardly of the die, so that the shank portion $c$ of the blank, that is the shank portion which has been reduced in diameter, also lies loosely in this portion of the die bore.

Between the portions 4 and 5 of the die bore 2 is an annular area 6, which is inclined rearwardly at a greater pitch than the portion 4 of the die bore. As the extruding die is forced forwardly over the shank of the blank, the actual bearing of the die on the metal of the blank is at the line 7, the inclined shoulder 8, and region 9 in the portion 5 of the die bore. This region 9 is a diameter equal to the desired diameter of the reduced portion of the shank.

During the operation of forcing the die 1 over the bolt or screw blank, the inclined shoulder 8 of the die bore forms on the blank an inclined shoulder d, which separates the portion b of the blank from the portion c thereof. As the portion c of the blank is to be subsequently threaded, it has been found most advantageous to have the inclination of the die shoulder 8 correspond to the cross sectional contour of a thread of standard form. As shown, the shoulder 8 corresponds to the cross sectional contour of a U. S. standard thread. It should be understood, however, that it may be made to correspond to the cross sectional contour of other standard threads, such as the Whitworth English thread or the sharp V thread.

In performing a trimming and extruding operation the shank of the bolt or screw blank in its original form is picked up by the forward portion 4 of the die bore. As it is brought into contact with a trimming die, or other suitable stop, the shank is centered by the conical contour of this portion of the bore. After contact, the end of the shank is centered in the region 6, and the die is forced forwardly over the shank of the blank. The final reduction is produced by the region 9 in the portion 5 of the die bore 2, such region being of the diameter desired for the reduced portion c of the shank. This action is assisted however by the line 7 at the rearward end of the region 6, and by the inclined shoulder 8 between line 7 and the final reducing region 9.

The combination of reducing surfaces results in the formation of a smooth and uniform reduction in the diameter of the shank portion c, and the formation of a shoulder d of the desired contour, without any undesired upsetting of the metal to form a band of increased diameter at the forward end of the rearward portion b of the shank. This effect is largely attributable to the preliminary reduction by the inclined shoulder 8 of the die bore. The inclined region 6 effects the initial centering of the shank of the blank which results in uniformity in the depth of the shoulder d diametrically of the shank, and being of constricted diameter adjacent the shoulder, tends also to prevent the formation of the upset area noted immediately above.

The modified form of die, illustrated in Figure II of the drawings, is identical with that shown in Figure I except in one detail of its structure. Thus the general arrangement of the die body 1a and the forward punching face 3a are identical with die body 1 and punching face 3w. The die bore 2a is also divided into a forward bore portion 4a and rearward bore portion 5a, while the shoulder 8a and final reducing region 9a are identical with the shoulder 8 and region 9.

The inclined region 6a in the bore portion 4a is also identical throughout part of its length with the inclined portion 6 shown in Figure I of the drawings. Toward the rearward end of the portion 6a, however, the line 7 is replaced by a narrow annular region 10, which is of the initial diameter of the shank or very slightly less than such diameter. This annular region 10 resists forward flow of the metal during the extruding operation, and thus assists in preventing the formation of an annular ridge, or upset area, at the rearward end of the shank portion b.

It will be noticed that the bolt or screw blank A is bound in the die, at the end of the extruding operation, only by contact with the line 7 or with the narrow region 10, and the narrow region 9 or 9a. It may therefore be readily discharged from the die by any suitable form of clearing tool.

What I claim is:

1. An extruding die for use in reducing the cross sectional area of a portion of the shank of a bolt or screw blank having therein a bore divided into forward and rearward portions by an inclined shoulder-forming portion, a second inclined portion adjacent the shoulder-forming portion in the bore and terminating immediately adjacent said shoulder-forming portion in an annular region of a diameter substantially equal to the unchanged shank diameter of the blank.

2. A die for the cross-sectional reduction of the portion of a bolt shank which is to be threaded, which die has formed therein a bore that is divided into forward and rearward portions by an inclined shoulder-forming portion, a die face at the mouth of said forward bore portion comprising a shearing element which in plan conforms to the head of the bolt to be so reduced, the distance from such face of the die to the said shoulder-forming portion being equal to the length of that portion of the bolt shank which is not to be reduced for threading, which die includes between said shoulder-forming portion and said forward bore portion a region of less inclination than said shoulder-forming portion and of greater inclination than said forward bore portion, and includes between said shoulder-forming portion and said rearward bore portion an annular surface which is of relatively short length and whose diameter is substantially equal to that desired for the reduced portion of the bolt shank.

3. A die for the cross-sectional reduction of the portion of a bolt shank which is to be threaded, which die has formed therein a bore that is divided into forward and rearward portions by an inclined shoulder-forming portion, each of said forward and rearward bore portions diverging outwardly from said shoulder-forming portion, a die face at the mouth of said forward bore portion comprising a shearing element which in plan conforms to the head of the bolt to be so reduced, and said forward bore portion having an annular inclined region adjacent the inclined shoulder-forming portion, which region is inclined to less degree than said shoulder-forming portion, and to greater degree than said forward, diverging bore portion, and an annular surface between said shoulder-forming portion and said rearward diverging portion, which annular surface has a diameter substantially equal to that desired for the reduced portion of the bolt shank.

In witness whereof I hereunto set my hand.

ARCH S. WHITE.